United States Patent [19]

Shichida et al.

[11] 4,082,019
[45] Apr. 4, 1978

[54] TOOL-INDEXING APPARATUS FOR MACHINE TOOL

[75] Inventors: Hiromichi Shichida; Kenichi Toyoda; Jiro Nakano, all of Hino, Japan

[73] Assignee: Fujitsu Fanuc Limited, Tokyo, Japan

[21] Appl. No.: 760,713

[22] Filed: Jan. 19, 1977

[30] Foreign Application Priority Data

Jan. 23, 1976 Japan .................................. 51-5826

[51] Int. Cl.² .......................................... B23B 29/32
[52] U.S. Cl. .................................... 82/36 A; 74/826
[58] Field of Search ....................... 82/36 A; 74/826

[56] References Cited

U.S. PATENT DOCUMENTS

| | | | |
|---|---|---|---|
| 2,319,895 | 5/1943 | Walker | 74/826 X |
| 3,589,213 | 6/1971 | Gourley | 74/826 |
| 3,675,519 | 7/1972 | McCullough | 82/36 A |
| 3,760,655 | 9/1973 | Buchmeier | 82/36 A |
| 3,905,257 | 9/1975 | Thumm et al. | 82/36 A |

*Primary Examiner*—Leonidas Vlachos
*Attorney, Agent, or Firm*—Staas & Halsey

[57] ABSTRACT

In a tool-indexing apparatus, the apparatus comprises a member being moved in a linear direction, one set of ball screws which connects between the member and a tool-post, a stopper which restricts the linear movement of the tool-post, and two coil springs which resist against the linear movement of the tool-post and the member. During the operation of the apparatus, first, the member together with the tool-post are lifted, and after the tool-post has become abutted against the stopper via one of the two coil springs, the tool-post is revolved by means of one set of ball screws and by the other one of the coil springs for establishing the tool-indexing operation of the apparatus.

5 Claims, 6 Drawing Figures

TOOL-INDEXING APPARATUS FOR MACHINE TOOL

BRIEF DESCRIPTION OF THE INVENTION

The present invention relates generally to an apparatus for a machine tool. More particularly, the invention relates to an improved tool-indexing apparatus for the machine tool.

BRIEF DESCRIPTION OF THE PRIOR ART

In the conventional prior art, especially in the conventional tool-indexing apparatus for a numerically controlled lathe, the indexing operation of the tool is accomplished as follows. A tool-post is first lifted from a base by means of hydraulic cylinders or the like. After the tool-post is disengaged from a positioning pin located on the base, the tool-post is turned by a turning device or the like so that the predetermined indexing angle of the tool-post may be obtained. Therefore, the operation of such a tool-indexing apparatus should be carried out in a predetermined order, i.e. in the order of the hydraulic cylinders of the turning device and so on. For this reason, the conventional tool-indexing apparatus has become very complicated.

OBJECTS OF THE INVENTION

Accordingly, it is the general object of the present invention to obviate the aforementioned difficulty by providing an improved tool-indexing apparatus which has a simple construction and ensures the easy indexing of the tool by utilizing the acting force of a member which moves in a linear direction.

It is an object of the present invention to provide an improved tool-indexing apparatus which enables the accurate indexing operation for the tool-post.

It is another object of the present invention to provide an improved tool-indexing apparatus which has a damping means for regulating the lifting and the descending rate of the tool-post so as to prevent excess rate of the movement of the tool-post.

Other further objects of this invention will become apparent to one skilled in the art after reading the illustrative embodiments described hereinafter or indicated in the appended claims.

BRIEF DESCRIPTION OF THE DRAWINGS

A preferred embodiment of the invention will now be described in detail with reference to the accompanying drawings, wherein the same reference numerals are used to designate similar parts throughout the several views, in which.

DETAILED DESCRIPTION OF THE INVENTION

Figure 1:
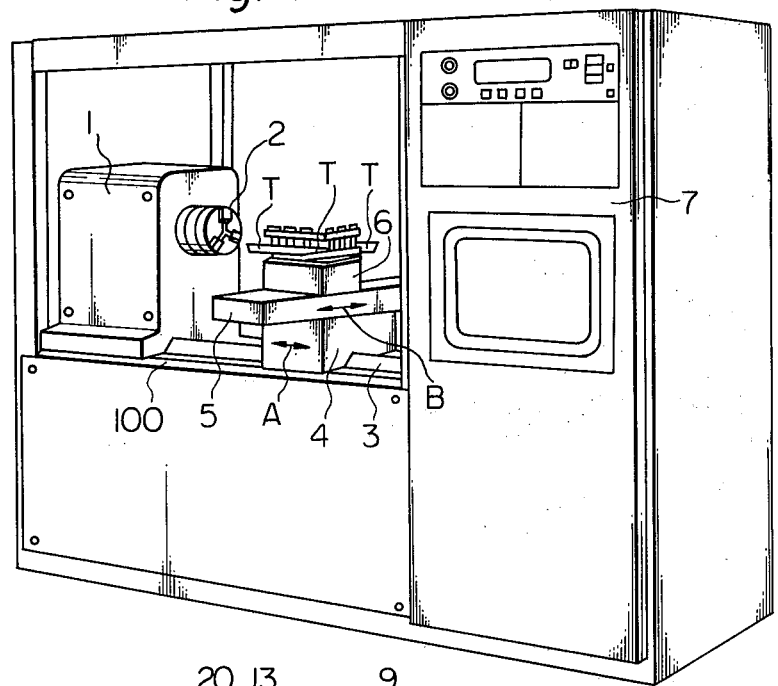
FIG. 1 is a perspective general view showing a conventional machine tool.

In FIG. 1, showing a general view of a conventional machine tool, a headstock of a machine tool is indicated by the numeral 1. A chuck 2 is fixedly mounted on a spindle (not shown) in the headstock for holding a workpiece (not shown) therewith. Guide rails 3 are provided on a bed 100 of the machine tool. A carriage 4 is movable along the guide rails 3 in the direction indicated by the arrows A. A cross-slide 5 is movably mounted on the carriage 4 in the direction of the arrows B. A tool-post 6 is mounted on the cross-slide 5 for the purpose of carrying out the tool-indexing. A control box 7 is utilized as an NC means (numerical control).

A plurality of tools T is held on the turnable tool-post 6. The NC means 7 is operated to send a command to the driving means (not shown) causing the indexing and positioning of the tool-post 6, thus the tool T to be used for cutting the workpiece is selected. In turn, the tool-post is adjustably moved in both directions A and B so as to determine the position of the leading edge of the tool T. Then, the tool T commences to cut the workpiece which is held on the chuck 2.

Figure 2:
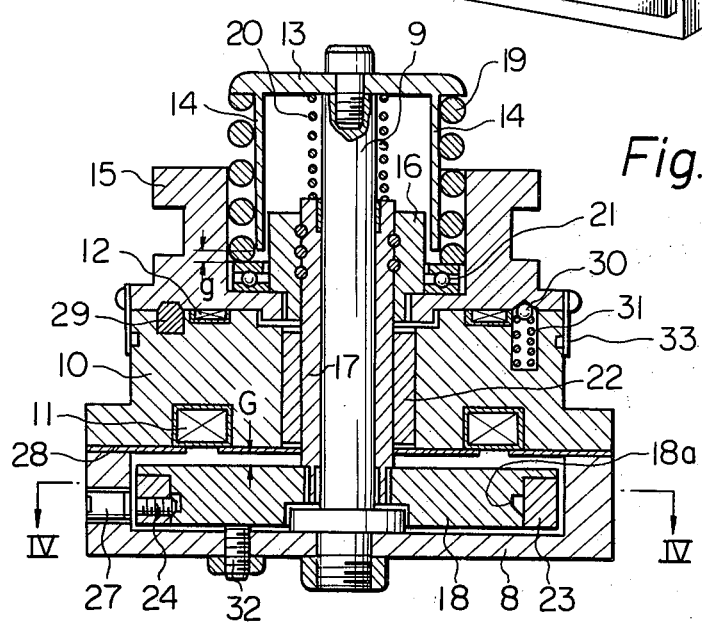
FIG. 2 is a cross-sectional view showing an embodiment of a tool-indexing apparatus according to the present invention.
Figure 3:
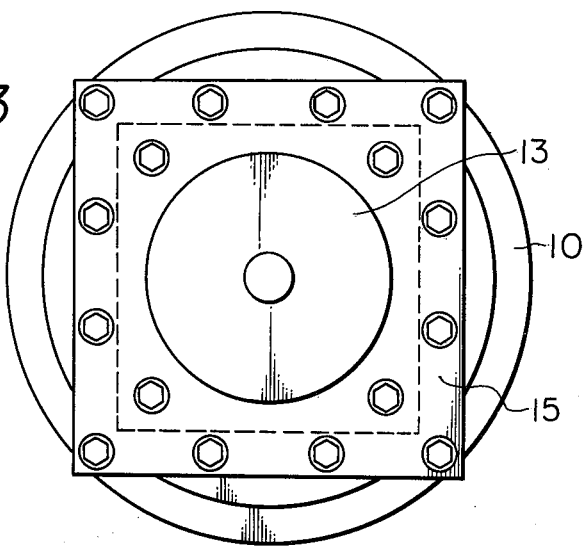
FIG. 3 is a top plan view showing the apparatus of FIG. 2.
Figure 4:
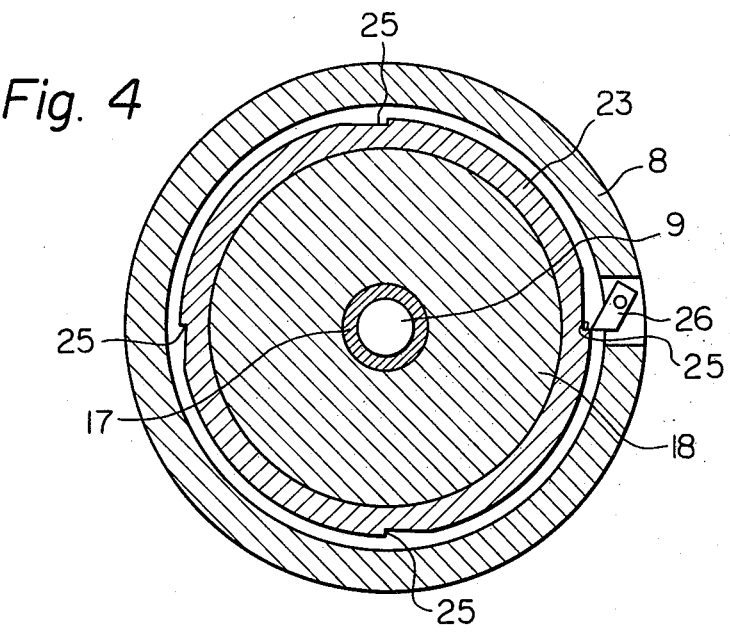
FIG. 4 is a horizontal sectional view taken along line IV—IV of FIG. 2.

In FIGS. 2 through 4, showing an embodiment of the tool-indexing apparatus according to the present invention, a casing of the apparatus in question is indicated by the numeral 8. A vertical shaft 9 is secured to the central part of the casing 8. A base 10 is secured to the casing 8 by bolts (not shown). Two kinds of exciting coils 11 and 12 are provided in the lower and upper portions of the base 10, respectively. A stopper 13 is secured to the upper end of the shaft 9. The stopper 13 is integrally provided with an engaging leg 14. This engaging leg 14 is projected downwardly within the hole being provided inside of the tool-post 15.

The numeral 15 denotes a tool-post according to the present invention. A female ball-screw 16 is integrally connected inside of the tool-post 15 by means of screw threading. A male ball-screw 17, meshing with the female ball-screw 16, is vertically guided along the shaft 9. At the lower end of the male ball-screw 17 a plate 18, which can be attracted by magnetic force, is integrally connected to this ball-screw 17 by means of screw threading. A ball-screw-engagement is performed between the female ball-screw 16 and the male ball-screw 17.

One end of a coil-spring 19 abuts against the underside of the stopper 13 and the other end abuts against a thrust ball-bearing 21, which is located at the bottom of the inside of the tool-post 15. One end of another coil spring 20 abuts against the underside of the stopper 13, and the other end abuts against the upperside of the male ball-screw 17. A journal bearing 22 secured to the inside of the base 10 is loosely fitted to the outer surface of the male ball-screw 17.

A wheel 23 has a set screw 24 in its outer periphery. Also, the plate 18 is provided with an annular groove 18a on its outer periphery. Thus, the wheel 23 can be securely fixed to the outer periphery of the plate 18 by tightening the set screw 24.

The numeral 25 in FIG. 4 denotes notched portions arranged at predetermined distances from each other along the outer periphery of the wheel 23. A pawl 26 is movably mounted on the casing 8 and can be meshed with any one of the notched portions 25. A plug is denoted in FIG. 2 by the numeral 27.

A magnetic substance 28 is secured to the under surface of the base 10. A positioning pin 29 is firmly provided on the upper surface of the base 10. A ball 30 is provided with a coil spring 31. The numeral 32 denotes an adjusting screw.

The operation of the embodiment mentioned above is described in detail hereinafter.

In FIG. 2, showing the initial condition of the present invention, the predetermined clearances (G and g) are provided between the base 10 and the plate 18, and between the thrust ball bearing 21 and the leading edge of the engaging leg 14 of the stopper 13, respectively. The clearance G is designed to be larger than the clearance g. In this condition, when the exciting coil 11 is activated, the magnetic circuit will generate a magnetic attractive force between the base 10 and the plate 18 so as to draw the plate 18 upwardly toward the base 10.

Due to the above magnetic attractive force, the plate 18 commences to lift the male ball-screw 17 which is integrally connected to the plate 18, the female ball-screw 16 which has a ball-screw-engagement with the male ball-screw 17, and the tool-post 15 which is integrally connected with the female ball-screw 16, against the pressure of the coil springs 19 and 20. First, tool-post 15 is disengaged from positioning pin 29 which is firmly provided on the base 10. Immediately after such disengagement, the thrust ball bearing 21 comes to abut the leading edge of the engaging leg 14 of the stopper 13 so as to stop the lifting motion of the tool-post 15. However, due to the fact that the connection between the male ball-screw 17 and the female ball-screw 16 is in the form of ball-screw-engagement, tool-post 15 can still be moved.

Both ball-screws 16 and 17 are threaded in a right-hand helix. The pawl 26 in the casing 8 may be engaged with any one of the notched portions 25 arranged along the outer periphery of the wheel 23. The wheel 23 is secured to the plate 18, which is integrally connected to the male ball-screw 17. Therefore, right-hand revolution (counterclockwise revolution according to FIG. 4) of the male ball-screw 17 will be prevented. Thus, during the lifting movement of the male ball-screw 17, the female ball-screw 16, which is prevented from lifting by being abutted against the engaging leg 14 of the stopper 13, is forced to turn in the left-hand direction. As a result of this, the tool-post 15 is driven in the left-hand direction. The apparatus according to the present invention is adjusted in such a way that, as the clearance G between the plate 18 and the base 10 approximates 0, the angle of revolution of the tool-post 15 approaches the predetermined angle. After the tool-post has revolved through the predetermined angle (in the case of the drawings, such angle equals 90°), the current in the exciting coil 11 is switched off so as to terminate the magnetic attractive force.

When the magnetic attractive force through the exciting coil 11 has been terminated, the coil springs 19 and 20 press the tool-post 15 together with the plate 18 downward. The tool-post 15 is positioned and stopped in the correct position by engaging the positioning pin 29 with the corresponding hole thereto. From this moment onwards, ball screws 16 and 17 cause the plate 18 to rotate in in the left-hand helical direction. The force of coil spring 20 causes plate 18 to descend until the plate 18 abuts against the adjusting screw 32. As a result, an entire apparatus is returned to the initial position. At this time, if the exciting coil 12 is activated, the tool-post 15 can be drawn to the base 10 by the magnetic attractive force created by exciting coil 12.

The ball 30 with the coil spring 31 serves as a ball-detent. The magnetic substance 28 is utilized to enlarge the magnetic field of the exciting coil 11. Cover 33 is an apparatus which prevents dust from entering between the tool-post 15 and the base 10. Because of adjusting screw 32, which can adjust the clearance G between the base 10 and the plate 18, the indexing angle of the tool-post 15 can be adjusted. By loosening and then retightening the set screw 24, an operator can control the relative position of the wheel 23 to the plate 18, thus making it possible to adjust the starting position of the turning of the tool-post 15.

Although the lifting of the plate 18 caused by the magnetic attractive force is used as a driving force in the illustrated embodiment, it will be apparent that any kind of hydraulic pressure may be employed for this purpose. There is also provided a positioning pin 29 for determining the position of the tool-post 15, although other positioning means may be appropriate for this purpose.

Figure 5:
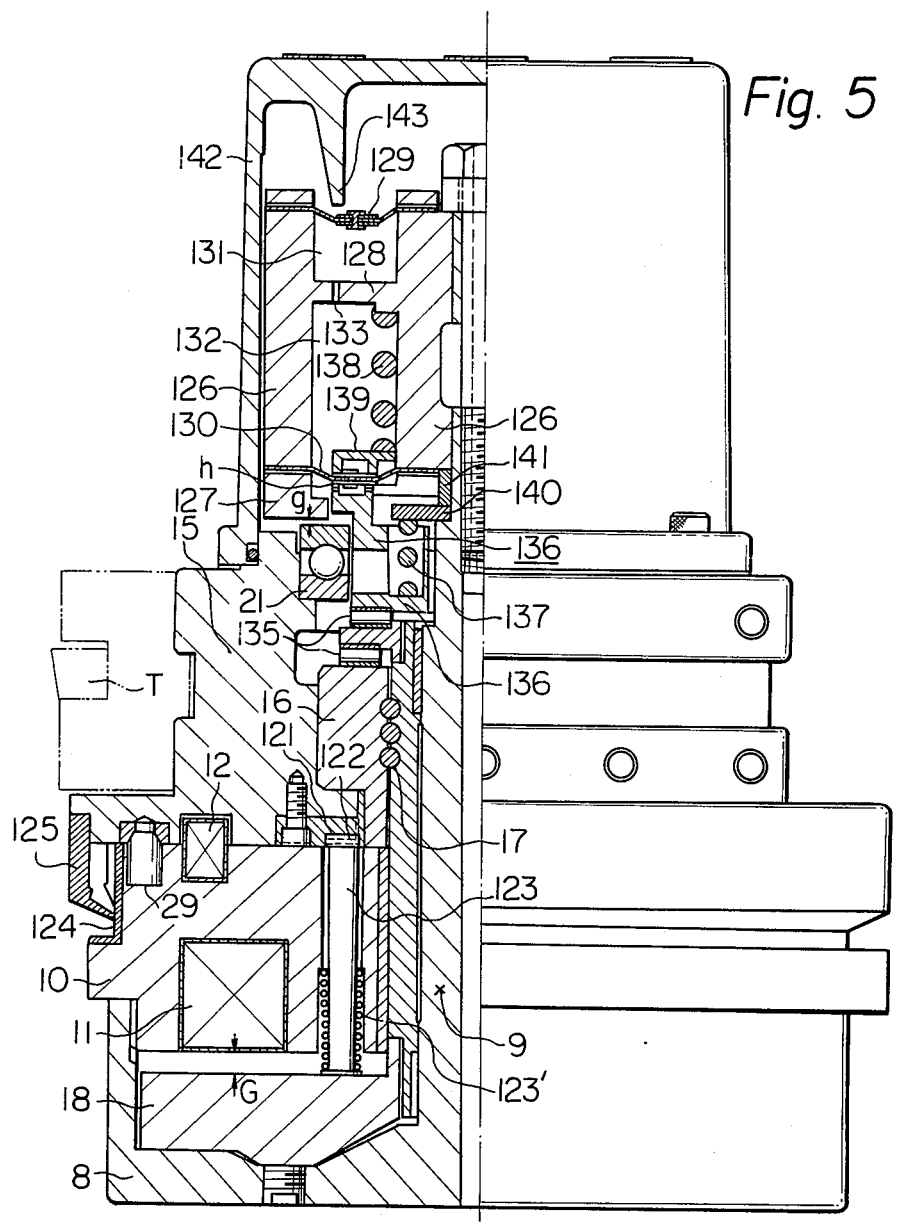
FIG. 5 is a half cross-sectional view showing another embodiment of the tool-indexing apparatus according to the present invention.
Figure 6:
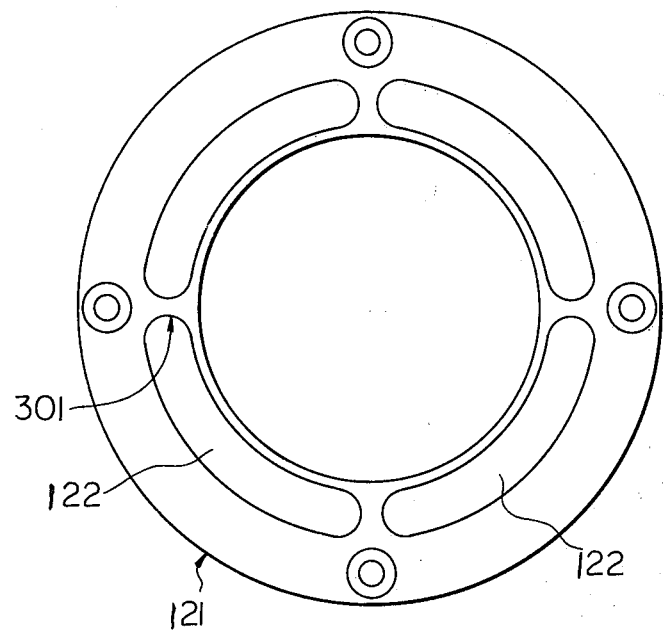
FIG. 6 is an enlarged bottom view showing the elongated grooves of the stop plate in FIG. 5.

In FIGS. 5 and 6, showing another embodiment of the invention, a stop plate 121 is provided under the surface of the tool-post 15, said stop plate being formed in the shape of an annular plate and having elongated grooves 122 under the surface thereof. Each of said grooves 122 has a predetermined length. A stop pin 123 with the coil springs 123' is accommodated inside a hole within the base 10. Therefore, the bottom end of the stop pin 123 is usually in contact with the plate 18. In the case when the apparatus is located in its initial condition, the upper surface of the base 10 and the top end of the stop pin 123 are adjusted to be on the same level.

In FIG. 6, showing an enlarged bottom view of the stop plate 121, there are four grooves 122 provided on the bottom surface of said stop plate 121. One of the grooves 122 is provided in each of the four quarter sectors of plate 121. Stop pin 123 is projected into any one of the four circular grooves 122, when plate 18 is lifted, and rotates with plate 18 until said stop pin 123 abuts against the end portion 301 of the grooves 122. Stop plate 121, and consequently tool-post 15, are firmly stopped in this position.

As shown in FIG. 5, a damper element secured on the shaft 9 is generally indicated by 126. As explained hereinafter, this damper element 126 keeps tool-post 15 from over-shooting during the indexing operation.

A lower end of 127 of the damper element 126 serves as the stopper with respect to the uppermost lifting limit of the tool-post 15, i.e. that of the female ball-screw 16. The damper element 126 includes a single partition 128 and two chambers 131 and 132 having diaphragms 129 and 130. An orifice 133 is provided in the partition 128. The spaces within the two chambers 131 and 132 are filled with oil. A needle-bearing 135 and a hydraulic piston 136 are also shown in FIG. 5. In the condition according to FIG. 5, the clearance $h$ is provided at the lower surface of the diaphragm 130 and the upper end of the piston 136 to allow free movement as male ball-screw 17 begins to rise. A returning spring 137 for the male ball-screw 17 is located in the piston 136. A returning spring 138 is provided for the damper element 126. A receiving member 139 is provided for the spring 138. The upper end of the returning spring 137 abuts against a spring receiving member 140, and said spring receiving member 140 is suspended from damper element 126 by spacer 141.

During the lifting operation of the male ball-screw 17, the piston 136 provided on the upper end of the ball-screw 17 is lifted against the pressure of the returning spring 137. As a result, the diaphragm 130 is pressed by the upper end of the piston 136 so as to move a part of the oil in the chamber 132 to chamber 131 through the orifice 133, and the coil spring 138 is compressed. Therefore, even if its inertia is large, the motion of tool-post 15 can be damped by cooperation of the damper element 126 with the coil spring 138.

In contrast to the above, during the descending operation of the tool-post 15, the diaphragm 129 is pressed by means of a projection 143 of a machine frame 142. Thus the damping operation of the tool-post 15 is effected.

In FIG. 5, covering 124 made of a non-magnetic material is provided to cover the entire circumference of the base 10. A wiper 125 also made of a non-magnetic material is provided to surround the entire circumference of the tool-post 15 and to extend downwardly so as to be closely in contact with said covering 124 at its leading edge. As a result of such construction, during the movements (lifting or revolving) of the tool-post 15 with respect to the base 10, the chip being produced by cutting can be prevented from entering in between the tool-post 15 and the base 10. Also, due to the fact that the covering 124 and the wiper 125 are made of the non-magnetic material, there is no chance for the chip of the workpiece to become bonded onto the covering 124 and the wiper 125.

It is apparent from the foregoing description of the apparatus, according to the present invention, that the tool-post 15 may be disengaged from the base 10 by means of a simple lifting motion of the plate 18, i.e. of the male ball-screw 17 which is integrated with said plate 18. The turning of the tool-post 15 can be accomplished at a correct predetermined angle. Accordingly, the construction of the apparatus becomes simple, and the indexing of the tool-post can be achieved in an easy and correct manner.

What is claimed is:

1. A tool-indexing apparatus for a machine tool comprising:
    a first means being moved along a first direction by means of a driving source;
    a tool-holding means being screw-engaged to said first means, and;
    a stop means for restricting the movement of said tool-holding means along the first direction; wherein at the time when said movement of said first means takes place along said first direction, said tool-holding means together with said first means are moved along said first direction until said movement of said tool-holding means along said first direction is restricted by means of said stop means, and wherein after the time when said movement of said tool-holding means along said first direction is restricted by means of said stop means, said tool-holding means is forced to turn with said the movement of said first means in said first direction.

2. An apparatus according to claim 1, wherein the apparatus includes:
    a first spring means which actuates to move said tool-holding means in the opposite direction with respect to said first direction, and;
    a second spring means which actuates to move said first means in the opposite direction with respect to said first direction; wherein when the supply of the driving source is intercepted, said tool-holding means is returned to it's initial position in the first direction by means of said first spring means, and wherein during the revolution of said first means which is generated by means of the coopoeration of said second spring means and the screw-engagement, said first means is returned to its initial position.

3. An apparatus according claim 1, wherein the apparatus includes:
    a stop pin moving along said first direction together with said first means, and;
    an elongated circular groove portion provided under the surface of said tool-post; said stop pin abuts against the terminal end of said groove so as to interrupt the turning of said tool-post.

4. An apparatus according to claim 1, wherein the apparatus includes:
    a damper means which enables a damping movement for the turning of said tool-post, said damping movement being effected along said first direction by means of said movement of said first means wherein, however, at the beginning of the above movement of said first means said damping movement of said damper means may be restricted.

5. An apparatus according to claim 1, wherein said driving source is an electromagnetic source.

* * * * *

UNITED STATES PATENT AND TRADEMARK OFFICE
CERTIFICATE OF CORRECTION

PATENT NO. : 4,082,019
DATED : April 4, 1978
INVENTOR(S) : Shichida et al

It is certified that error appears in the above–identified patent and that said Letters Patent are hereby corrected as shown below:

Column 6, line 11, delete "said".

Signed and Sealed this

Third Day of October 1978

[SEAL]

Attest:

RUTH C. MASON
*Attesting Officer*

DONALD W. BANNER
*Commissioner of Patents and Trademarks*